(12) United States Patent
Barrow

(10) Patent No.: US 7,751,797 B1
(45) Date of Patent: Jul. 6, 2010

(54) SYSTEMS AND METHODS FOR PROVIDING PRESENCE INFORMATION

(75) Inventor: Steven Wesley Barrow, South Riding, VA (US)

(73) Assignee: Nextel Communications Inc., Reston, VA (US)

( * ) Notice: Subject to any disclaimer, the term of this patent is extended or adjusted under 35 U.S.C. 154(b) by 846 days.

(21) Appl. No.: 11/334,692

(22) Filed: Jan. 19, 2006

(51) Int. Cl.
*H04M 11/04* (2006.01)

(52) U.S. Cl. ............... 455/404.2; 455/426; 455/466; 455/517; 455/519

(58) Field of Classification Search ............ 455/518, 455/90, 426, 466, 520, 404.2; 709/207; 370/401, 370/310
See application file for complete search history.

(56) References Cited

U.S. PATENT DOCUMENTS

| | | | | |
|---|---|---|---|---|
| 6,026,296 A * | 2/2000 | Sanders et al. | ............ | 455/426.1 |
| 2003/0148779 A1 * | 8/2003 | Aravamudan et al. | ....... | 455/519 |
| 2003/0236093 A1 * | 12/2003 | Drozt et al. | .................. | 455/450 |
| 2004/0190535 A1 * | 9/2004 | Albal et al. | ................. | 370/401 |
| 2006/0031368 A1 * | 2/2006 | deCone | ...................... | 709/207 |
| 2006/0058025 A1 * | 3/2006 | Barrow | ....................... | 455/433 |
| 2006/0123224 A1 * | 6/2006 | Klug et al. | ................... | 713/150 |
| 2006/0148503 A1 * | 7/2006 | Lasisi et al. | ................. | 455/518 |
| 2006/0184679 A1 * | 8/2006 | Izdepski et al. | ............. | 709/229 |

* cited by examiner

*Primary Examiner*—Charles N Appiah
*Assistant Examiner*—Michael T Vu

(57) ABSTRACT

Systems and methods for providing presence information to dispatch stations are provided. Presence information regarding a dispatch station in a first network can be provided to a dispatch station located in a second network using a private call alert with a "Do Not Alert" flag set. A dispatch processor in the first network can include a presence notification list, which identifies the dispatch station in the second network that should be notified of changes in the presence information for the dispatch station in the first network.

14 Claims, 5 Drawing Sheets

SYSTEMS AND METHODS FOR PROVIDING PRESENCE INFORMATION

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a "walkie-talkie" type of call, such as provided by Sprint Nextel Corporation and identified by the trade name Direct Connect. The popularity of dispatch calls is ever expanding and this increase in popularity has created a demand for more features to be associated with these types of calls.

One feature that would be desirable to provide is presence information. Presence information identifies the status of a dispatch station, such as whether the dispatch station is registered with the network. Due to limitations of some dispatch networks, presence information cannot be easily provided. For example, the iDEN network, such as that owned and operated by Sprint Nextel Corporation, does not currently provide presence information.

SUMMARY OF THE INVENTION

In view of the above-identified and other deficiencies of conventional dispatch networks, exemplary embodiments of the present invention provide presence information to dispatch stations. Specifically, exemplary embodiments of the present invention provide presence information regarding a dispatch station located in a first network to dispatch stations located in a second network. The presence information is provided without adding elements to the dispatch network.

In accordance with exemplary embodiments of the present invention, a "Do Not Alert" flag is included in a Private Call Alert message to obtain and update presence information regarding a dispatch station located in a first network. A location register in a dispatch processor of the first network includes a presence notification table, which identifies dispatch stations in a second network that are to be informed of changes in presence information for dispatch stations in the first network.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
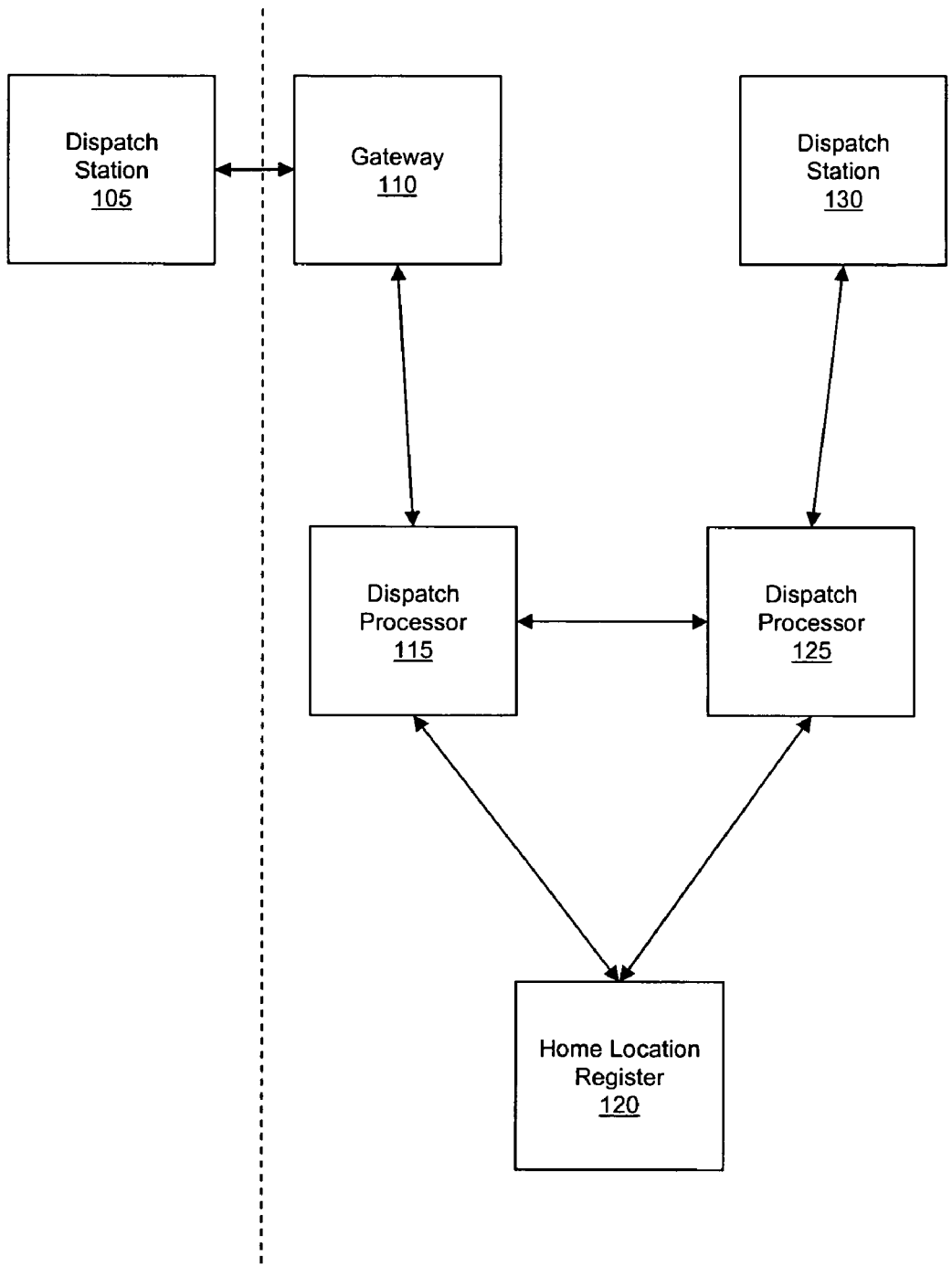
FIG. 1 is a block diagram of an exemplary dispatch system in accordance with the present invention.

FIG. 1 is a block diagram of an exemplary dispatch system in accordance with the present invention. The system illustrated in FIG. 1 includes a first network, Network A, and a second network, Network B. Network A can be any type of network, including a wired or wireless data network, such as the Internet, or the like. Network B can be a dispatch network and/or a network providing both dispatch and interconnect communications, such as the iDEN network. One or more dispatch stations 105 are located in Network A. Dispatch stations in network A can be, for example, general purpose computers executing a dispatch communications application.

The dispatch stations of Network A can communicate with each other and with dispatch stations of Network B via gateway 110. Gateway 110 can be an application server gateway (ASG). Gateway 110 is coupled to dispatch processor 115, which supports dispatch communications originating and terminating with dispatch stations in Network A. Dispatch processor 115 is coupled to one or more home location registers 120, and one or more dispatch processors 125. Dispatch processors 115 and 125 can be, for example, dispatch application processors (DAPs).

Conventionally, dispatch station 105 cannot obtain presence information regarding dispatch station 130. This limitation is due in part to the design of Network B, which does not include a provision for providing presence information. One solution for providing presence information about dispatch stations in Network B to dispatch stations in Network A is to provide a separate network element, such as a presence server. A presence server is a network element that is separate from, and coupled to, the home location register in order to receive presence information from the home location register. However, additional network elements typically introduce complexity in the network, and may require additional modifications to existing network elements.

Figure 2:
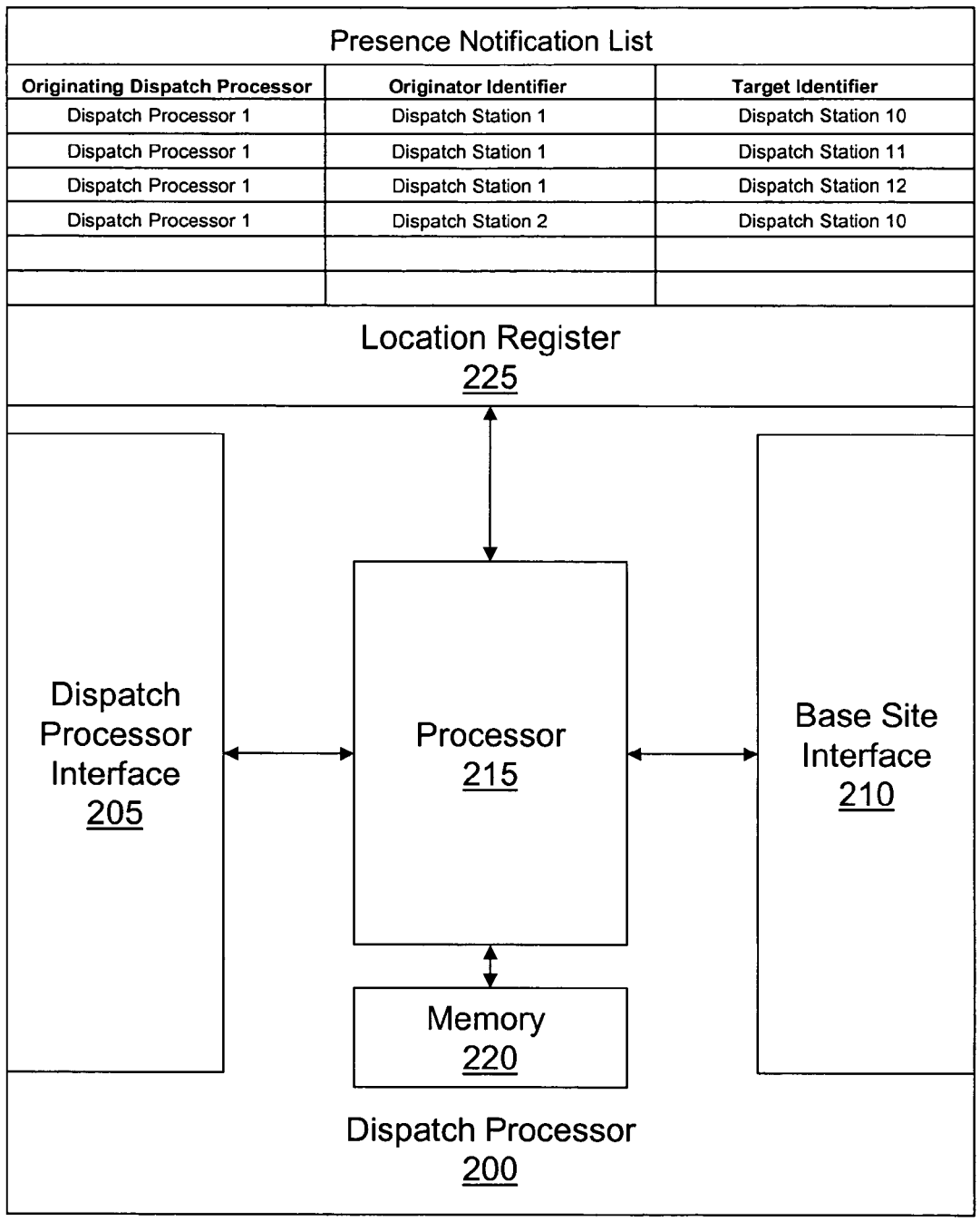
FIG. 2 is a block diagram illustrating an exemplary dispatch processor in accordance with the present invention.

In accordance with exemplary embodiments of the present invention, presence information can be provided to dispatch stations located in a different communication network without adding a presence server. Specifically, the present invention provides presence information using the location register of a dispatch processor. FIG. 2 is a block diagram illustrating an exemplary dispatch processor in accordance with the present invention. Dispatch processor 200 includes a dispatch processor interface 205, base site interface 210, processor 215, memory 220 and location register 225. Dispatch processor interface 205 can be any type of interface appropriate for interfacing with other dispatch processors. Base site interface 210 can be any type of interface appropriate for interfacing with wireless base sites. Processor 215 can be any type of processor, including a microprocessor, field programmable gate array (FPGA), application specific integrated circuit (ASIC), and/or the like. Memory 220 can be any type of memory, including read only memory, random access memory, flash memory, a hard drive and/or the like. Memory 220 can include a computer program product, which when loaded into processor 215, causes processor 215 to execute the processes described herein.

Location register 225 can be included in memory 220 or can be in a separate memory as illustrated in FIG. 2. Location register 225 can be a visitor location register (VLR). In order to provide presence information, exemplary embodiments of the present invention include a presence notification list in location register 225. The presence notification list maintains a list of dispatch stations in Network A that should be notified of changes in presence information for dispatch stations in Network B. Each entry in the list identifies a dispatch processor supporting the dispatch station in Network A ("Originating Dispatch Processor"), the dispatch station in Network A that desires the presence information ("Originator Identifier") and the dispatch station in Network B that is being monitored for presence information ("Target Identifier"). The Originator and Target Identifiers can be in an urban, fleet, mobile station identifier (UFMI) format, session initiation protocol (SIP) universal resource locator (URI) format, internet protocol (IP) address format, or visitor location register (VLR) record number format. The use of the presence notification list will be described in more detail below.

Figure 3:
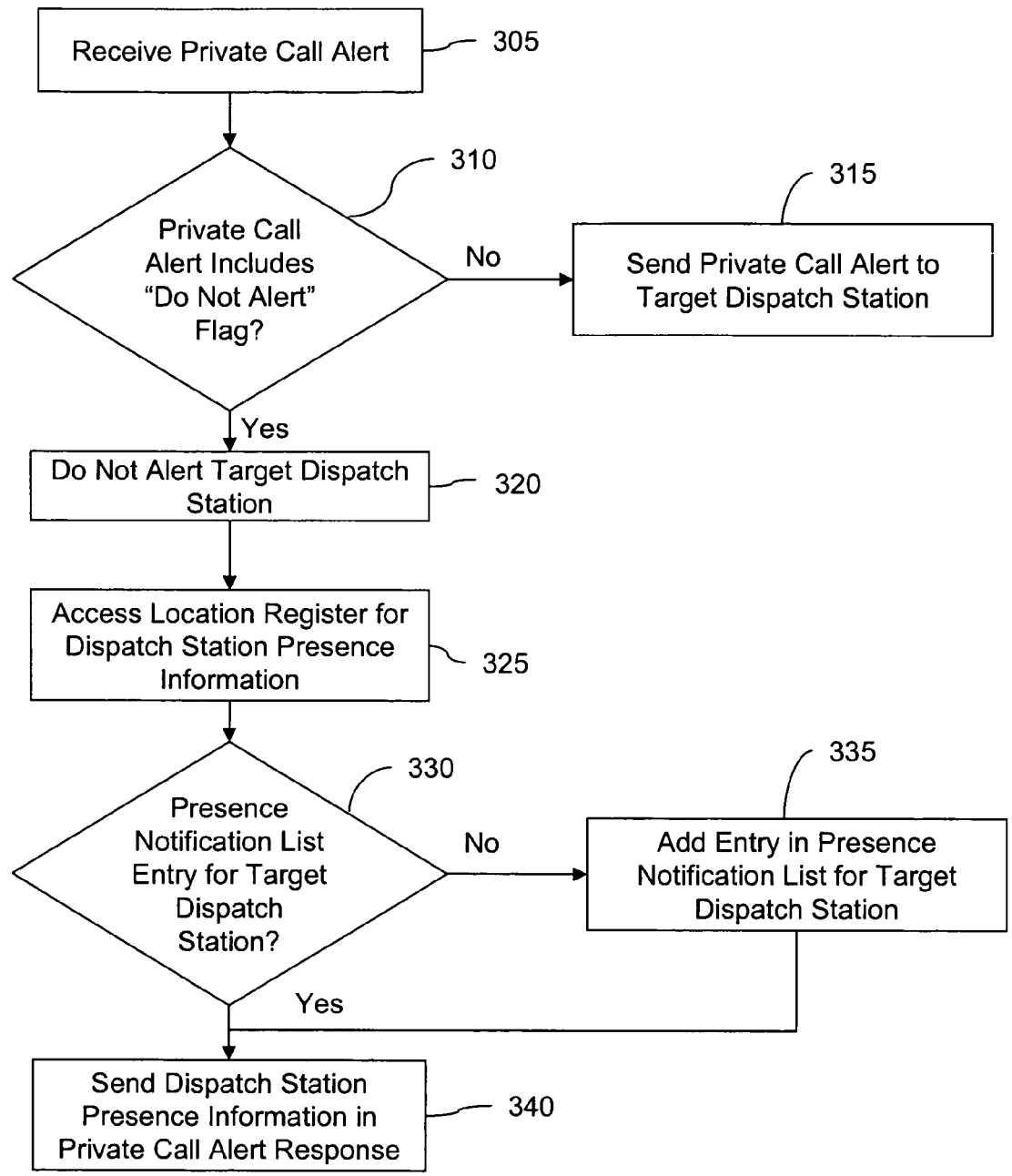
FIG. 3 is a flow chart illustrating an exemplary method for a dispatch processor receiving a presence request in accordance with the present invention.

FIG. 3 is a flow chart illustrating an exemplary method for a dispatch processor receiving a presence request in accordance with the present invention. The method of FIG. 3 can be performed by processor 215 using a computer program product stored in memory 220. When a dispatch processor receives a private call alert over dispatch processor interface 205 (step 305), processor 215 determines whether the private call alert includes a "Do Not Alert" flag (step 310). The "Do Not Alert" flag is an extension to existing private call alerts, and indicate that, unlike conventional private call alerts, the target dispatch station should not receive the private call alert. If the private call alert does not include such an flag ("No" path out of decision step 310), then the dispatch processor follows conventional procedures for a private call alert and sends the private call alert to the target dispatch station over base site interface 210 (step 315).

When the private call alert includes a "Do Not Alert" flag ("Yes" path out of decision step 310), then the dispatch processor does not alert the target dispatch station (step 320). The dispatch processor then accesses location register 225 for dispatch station presence information (step 325) and determines whether there is a presence notification list entry for the target dispatch station (step 330). When there is not a presence notification list entry for the target dispatch station ("No" path out of decision step 330), then the dispatch processor adds an entry to the presence notification list for the target dispatch station (step 335). As illustrated in FIG. 2, the entry will include an identification of the originating dispatch processor, the originating dispatch station and the target dispatch station. When there is a presence notification list entry for the target dispatch station ("Yes" path out of decision step 330) or after the entry is added to the presence notification list (step 335), then the dispatch processor sends the dispatch station presence information to the originating dispatch processor in a private call alert response over dispatch processor interface 205 (step 340).

Figure 4:
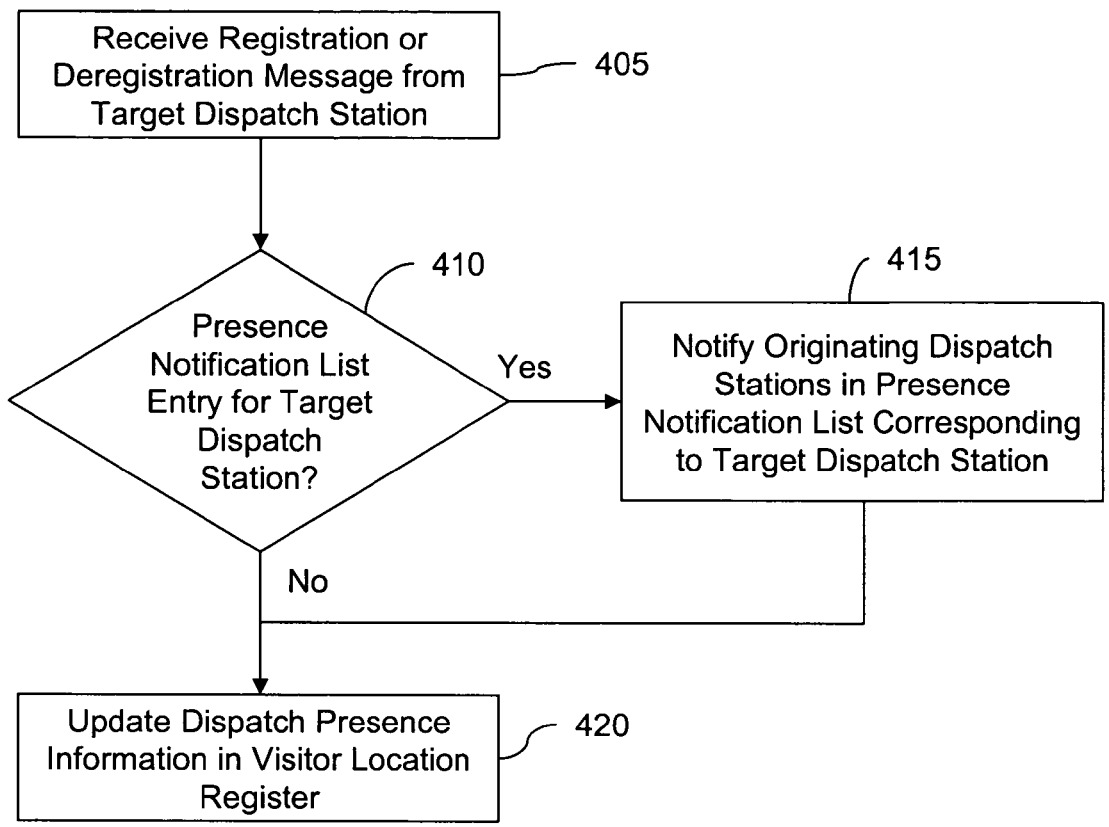
FIG. 4 is a flow chart illustrating an exemplary method for a dispatch processor receiving presence information in accordance with the present invention.

FIG. 4 is a flow chart illustrating an exemplary method for a dispatch processor receiving presence information in accordance with the present invention. The method of FIG. 4 can be performed by processor 215 using a computer program product stored in memory 220. When the dispatch processor receives presence information regarding a target dispatch station over base site interface 210, such as a registration or deregistration message, (step 405), the dispatch processor determines whether there is a presence notification list entry for the target dispatch station (step 410). When there is a presence notification list entry for the target dispatch station ("Yes" path out of decision step 410), then the dispatch processor notifies the originating dispatch stations identified in the presence notification list corresponding to the target dispatch station of the change in presence information over dispatch processor interface 205 (step 415). After the originating dispatch stations have been notified (step 415) or if there is not a presence notification list entry for the target dispatch station ("No" path out of decision step 410), then the dispatch processor updates the presence information in the visitor location register in accordance with conventional procedures (step 420). In other words, for registration requests the dispatch processor obtains information from a home location register for the dispatch station and adds an entry to visitor location register, and for deregistration requests the dispatch processor notifies the home location register and deletes the entry from the visitor location register.

Although FIGS. 3 and 4 have been described in connection with private call alerts, the present invention is equally applicable to group call alerts.

Figure 5:
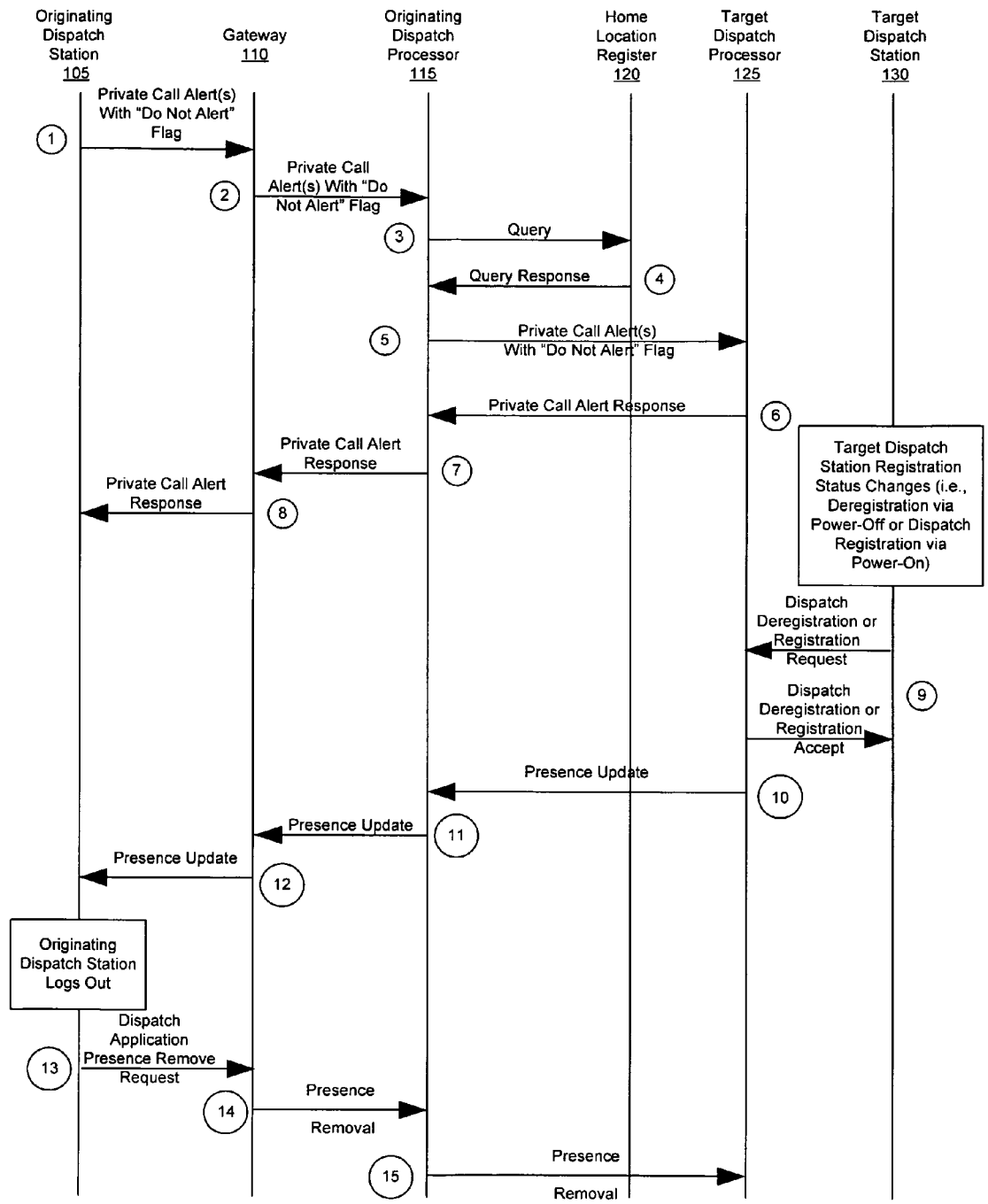
FIG. 5 is a signaling diagram of an exemplary call flow for providing presence information in accordance with the present invention.

FIG. 5 is a signaling diagram of an exemplary call flow for providing presence information in accordance with the present invention. The signaling diagram of FIG. 5 illustrates signaling for a dispatch station located outside of an iDEN network to obtain presence information regarding a dispatch station located in the iDEN network.

After dispatch station 105 successfully registers with gateway 110 and Network B, it will attempt to obtain the online status (Presence) of all dispatch stations that are defined in the dispatch station user's address book. In accordance with exemplary embodiments of the present invention, the online status of dispatch stations located in Network B are obtained by dispatch station 105 sending a private call alert, with the "Do Not Alert" flag set, for each dispatch station identifier (e.g., the urban, fleet, mobile station identifiers (UFMI) used in the iDEN network) associated with a dispatch station located in Network B in dispatch station 105 user's address book to gateway 110 (step 1). Dispatch station 105 can either send one private call alert for each UFMI, a group call alert for a group call UFMI, or a call alert with multiple UFMIs.

When gateway 110 receives a private call alert with the "Do Not Alert" flag set, gateway 110 forwards the message to dispatch station's 105 dispatch processor (Originating Dispatch Processor) (step 2). Originating dispatch processor 115 will use standard procedures to locate each target dispatch station's serving dispatch processor. Once originating dispatch processor 115 determines the target dispatch station's serving home location register, the originating dispatch processor will query the target dispatch station's home location 120 register for the dispatch station's serving dispatch processor (step 3). Originating dispatch processor 115 repeats this step and sends a send routing request for each UFMI that it received in the private call alert.

Upon receipt of the dispatch processor's query, home location register 120 performs a lookup to determine the target dispatch station's current serving dispatch processor. Home location register 120 returns the target dispatch station's serving dispatch processor identification to originating dispatch processor 115 via a query response message (step 4). Originating dispatch processor 115 receives a query response message for each query message that it sent.

Originating dispatch processor 115 then sends a private call request message to the serving dispatch processor (target dispatch station's dispatch processor) with the target dispatch station's UFMI and a "Do Not Alert" flag set (step 5). Upon receipt of the private call alert message with the "Do Not Alert" flag set, target dispatch processor 125 checks its visitor location register to determine if target dispatch station 130 is registered. Target dispatch processor 125 returns a private call alert response message to originating dispatch processor 115, indicating whether target dispatch station 130 is registered (step 6). Target dispatch processor 125 updates its presence notification list with the originating dispatch processor, the Originator's UFMI (i.e., the UFMI of dispatch station 105) and the target dispatch station's UFMI.

Upon receipt of the private call alert response from target dispatch processor 125, originating dispatch processor 115 forwards this message to gateway 110 (step 7), which in turn forwards this message to originating dispatch station 105 (step 8). Originating dispatch station 105 updates the target dispatch station's status in the dispatch station user's address book on the status of the target dispatch station (Registered or Not Registered).

When target dispatch station 130 changes its registration status (step 9), the target dispatch processor 125 notifies originating dispatch processor 115, which is identified in the presence notification list, by sending a presence update message indicating the target dispatch station's new status (step 10).

Upon receipt of the presence update message, originating dispatch processor 115 forwards the presence update message containing the target dispatch station's new status to gateway 110 (step 11). Originating dispatch processor 115 can also include a Watcher's List/table, which lists the dispatch station 105 user's UFMI (watcher), the target dispatch station's 130 UFMI (watched entity) and the target dispatch station's dispatch processor identification. Accordingly, when originating dispatch processor 115 receives any presence update message from target dispatch processor 125, originating dispatch processor 115 will know where to send the updates. Gateway 110 then forwards the presence update message to dispatch station 105, where the dispatch station updates the dispatch station user's address book with the new status of target dispatch station 130 (step 12).

When dispatch station 105 deregisters (e.g., logs out of the dispatch application running on the general purpose computer), dispatch station 105 sends dispatch station deregister request message to gateway 110 for each UFMI that is associated with a target dispatch station in the dispatch station user's address book (step 13). Upon receipt of the dispatch station deregister request message, gateway 110 forwards a presence removal message to originating dispatch processor 115 (step 14).

When originating dispatch processor 115 receives the presence removal message, the originating dispatch processor will forward the message to the target dispatch processor 125 indicating that the originator dispatch station's UFMI (i.e. dispatch station user's UFMI) should be removed (step 15). If necessary, originating dispatch processor 115 uses procedures to locate the target dispatch station's dispatch processor.

If the target dispatch processor 125 receives a cancel location message from home location register 120 for target dispatch station 130, which would indicate that target dispatch station 130 has moved to another dispatch processor, target dispatch processor 125 removes target dispatch station 130 from its visitor location register (i.e., deregister the target dispatch station) and from its presence notification list. Target dispatch processor 125 then forwards a presence update message back to originating dispatch processor 115 indicating that target dispatch station 130 is registered on another dispatch processor. Upon receipt of this message, originating dispatch processor 115 triggers a private call alert with the "Do Not Alert" flag set to the target dispatch station's new target dispatch processor, which then repeat steps 3-5 above.

Another possible variation of this implementation is to have the originating dispatch station obtain presence information for target dispatch stations by using standard SIP messaging (RFC 3265-Session Initiating Protocol (SIP)—Specific Event Notification) between the originating dispatch processor and the target dispatch station's dispatch processor. With SIP—Specific Event Notification, the private call alert message of step 5 and the presence removal message of step 15 would be replaced with a SIP SUBSCRIBE message and the private call alert message in step 6 and the presence update message of step 10 above would be replaced with SIP NOTIFY messages.

Although exemplary embodiments of the present invention have been described in connection with an iDEN dispatch network, the present invention is equally applicable to other types of dispatch networks. Moreover, although exemplary embodiments have been described with the presence information being a registration or deregistration status, the presence information can include any type of presence information, including whether the dispatch station is on a dispatch, data or interconnect call, or the like.

Although exemplary embodiments of the present invention have been described as using a private call alert and private call alert responses for obtaining presence information, other types of messages can be employed. The target dispatch processor can still include the presence notification list, and will interpret the other messages in a manner consistent with the methods described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing presence information, the method comprising the acts of:
   receiving, by a target dispatch processor from a second dispatch station, a dispatch call alert that includes a do not notify flag, wherein the target dispatch processor does not notify a target dispatch station of the dispatch call alert;
   determining presence information for the target dispatch station using information stored in the target dispatch processor;
   transmitting, by the target dispatch processor to the second dispatch station, a response to the dispatch call alert, wherein the response includes the presence information;
   determining that a presence status of the target dispatch station changes; and
   transmitting a presence status change to the second dispatch station.

2. The method of claim 1, further comprising the act of:
   determining that the target dispatch station is included in a presence notification list for the second dispatch station.

3. The method of claim 1, further comprising the act of:
   creating a presence notification list entry in a location register of the target dispatch processor for the target dispatch station.

4. The method of claim 3, further comprising the acts of:
   receiving, by the target dispatch processor, a presence notification regarding the second dispatch station; and
   deleting the presence notification list entry in response to the presence notification.

5. The method of claim 1, wherein the dispatch call alert is a private call alert.

6. The method of claim 1, wherein the dispatch call alert is a group call alert.

7. A method for providing presence information, the method comprising the acts of:
   creating a presence notification list entry in a location register of a target dispatch processor for a target dispatch station, wherein the presence notification list entry includes an identification of an originating dispatch processor, a second dispatch station, and the target dispatch station;

receiving, by a target dispatch processor, a dispatch call alert, wherein the target dispatch processor does not notify a target dispatch station of the dispatch call alert;

determining presence information for the target dispatch station using information stored in the target dispatch processor;

transmitting, by the target dispatch processor, a response to the dispatch call alert, wherein the response includes the presence information;

receiving, by the target dispatch processor, a presence notification regarding the second dispatch station; and deleting the presence notification list entry in response to the presence notification.

8. The method of claim 7, wherein the identification of the second and target dispatch stations is in an urban, fleet, mobile station identifier (UFMI) format, session initiation protocol (SIP) universal resource locator (URI) format, internet protocol (IP) address format, or visitor location register (VLR) record number format.

9. A dispatch processor, comprising:

a processor;

a visitor location register, wherein the visitor location register comprises a presence notification list, which identifies dispatch stations of a first network registered for presence information for dispatch stations of a second network; and a memory, the memory comprising a computer program product including instructions for executing the acts of receiving a dispatch call alert, wherein the dispatch call alert includes a do not notify flag;

determining presence information for a target dispatch station identified in the dispatch call alert using information stored in the visitor location register;

creating a presence notification list entry in the presence notification list for the target dispatch station;

transmitting a response to the dispatch call alert, wherein the response includes the presence information;

determining that a presence status of the target dispatch station changes;

determining that the target dispatch station is included in a presence notification list for the second dispatch station; and transmitting a presence status change to a second dispatch station of the first network.

10. The dispatch processor of claim 9, wherein the presence notification list entry includes an identification of an originating dispatch processor, a second dispatch station, and the target dispatch station.

11. The dispatch processor of claim 10, wherein the identification of the second and target dispatch stations is in an urban, fleet, mobile station identifier (UFMI) format, session initiation protocol (SIP) universal resource locator (URI) format, internet protocol (IP) address format, or visitor location register (VLR) record number format.

12. The dispatch processor of claim 9, wherein the computer program product further includes instructions for executing the acts of:

receiving a presence notification regarding the second dispatch station; and deleting the presence notification list entry in response to the presence notification.

13. The dispatch processor of claim 9, wherein the dispatch call alert is a private call alert.

14. The dispatch processor of claim 9, wherein the dispatch call alert is a group call alert.

* * * * *